A. E. THAYER.
Improvement in Spring Bed-Bottoms.
No. 114,225. Patented April 25, 1871.
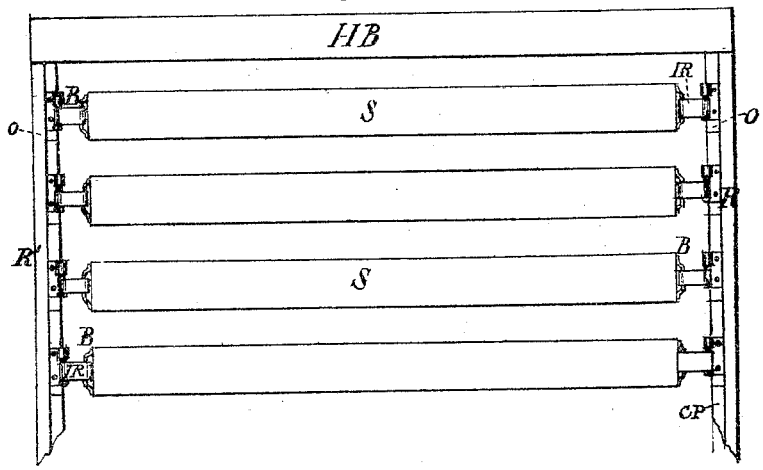
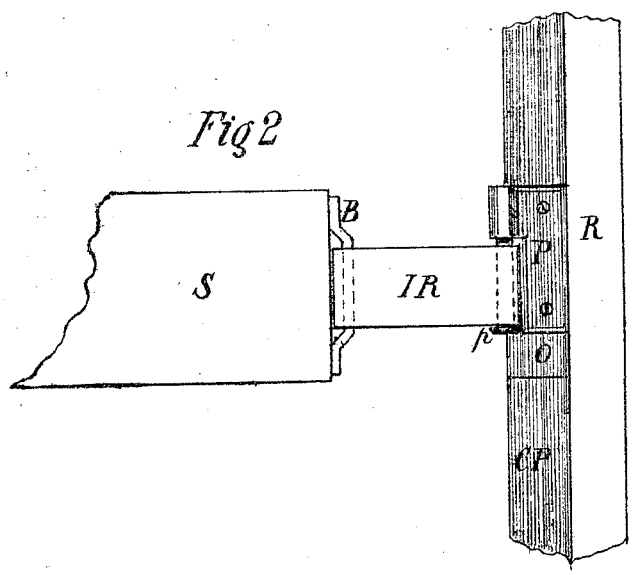
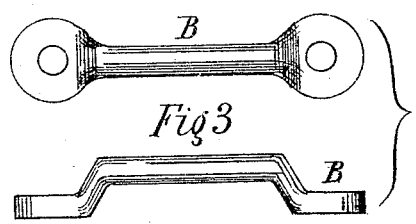
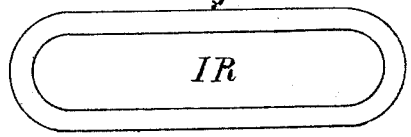
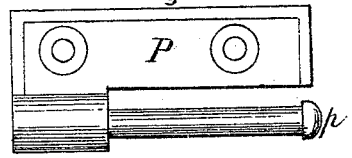
Witnesses
Joseph Evans
Frank Hart
Inventor
Austin E. Thayer

United States Patent Office.

AUSTIN E. THAYER, OF PHILADELPHIA, PENNSYLVANIA.

Letters Patent No. 114,225, dated April 25, 1871.

IMPROVEMENT IN SPRING BED-BOTTOMS.

The Schedule referred to in these Letters Patent and making part of the same.

I, AUSTIN E. THAYER, of Philadelphia, in the county of Philadelphia and State of Pennsylvania, have invented a new and useful Improvement in Spring Bed-Bottoms, of which the following is a specification.

The object of my invention is to provide a simple spring bed-bottom, so that the same will be elastic and springy, easily adjusted and set up, or taken apart for packing, cleaning, &c.

To accomplish the above results I fasten to the side rails or head and foot-board of the bed, as desired, metallic plates provided with an arm, said plates being placed in the slot or opening usually formed for securing the ends of the bed-slats.

On the arm of the plates is placed a heavy endless rubber band with the opposite end secured to the slat by means of a bracket, as will be more fully described hereinafter.

In the accompanying drawing—

Figure 1 is a top view of a portion of a bed, showing my invention applied.

Figure 2 is a broken and enlarged view of one of the slats and side rails of the bed, showing how the bed-bottom is formed.

Figure 3 is a detached view of the bracket used for securing the rubber band to the end of the slat.

Figure 4 is a detached and side view of the rubber band used.

Figure 5 is a detached view of the plate used for securing one end of the rubber band to the side rails or head and foot-board, as desired.

To enable those skilled in the art to make and use my invention, I will now describe the same.

H B is the head-board of a bed, and

R and R' the side rails.

At equal distances in the cross-pieces C P of the side rails are cut slots or openings O, as is usual for any ordinary slat-bed, with the exception that the outer edge is slightly beveled.

In the opening O is inserted, and secured by means of screws or otherwise, a metallic plate, P, as shown in figs. 1 and 2, said plate being provided with an arm, $p$, as is more plainly shown in fig. 5.

B, fig. 3, is a metallic bracket, through which passes the rubber band I R in order to secure the same firmly to the end of the slat S.

The bracket B is fastened to the end of the slat by means of screws, as shown in figs. 1 and 2; the rubber band I R is sufficiently strong to bear any ordinary weight that may be placed upon the slats, and at the same time sufficiently elastic to be springy, although not sufficient, when weight is put upon the slats, to allow them to fall but a short distance below the level of the opening O.

In adjusting my spring bed-bottom the rubber band on one end of the rail is passed over the arm $p$ of the plate P, and the slat drawn upon so that the rubber band on the opposite end of the slat will pass over the arm of the plate on the opposite side of the bed; the slats, when perfectly tight should be on a level with the top of the cross-piece C P.

If desired, the slats can be stretched on a frame and inserted in the bed, as is usual for spring bed-bottoms to be arranged.

Having thus described my invention,

What I claim, and desire to secure by Letters Patent, is—

The combination and arrangement of the rail C P, the plate P with its arm $p$, and rubber loop I R, bracket B, and slat S, as and for the purpose specified.

In testimony whereof I have hereunto signed my name in the presence of two subscribing witnesses.

AUSTIN E. THAYER.

Witnesses:
JOSEPH EVANS,
GEORGE E. NICHOLS.